United States Patent [19]

Stenger-Smith et al.

[11] Patent Number: 5,578,699
[45] Date of Patent: Nov. 26, 1996

[54] PROCESS FOR MAKING AMINO FUNCTIONAL POLY(PARA-PHENYLENE VINYLENE)S

[75] Inventors: John D. Stenger-Smith; William P. Norris; Andrew P. Chafin, all of Ridgecrest, Calif.; Scott T. Sackinger, Columbia, S.C.

[73] Assignee: The United States of America as represented by the Secretary of the Navy, Washington, D.C.

[21] Appl. No.: 457,350

[22] Filed: May 18, 1995

Related U.S. Application Data

[62] Division of Ser. No. 252,701, May 31, 1994.

[51] Int. Cl.[6] ................ C08G 75/00; C08F 6/00
[52] U.S. Cl. .............. 528/373; 528/377; 528/391; 528/396; 528/481; 528/503
[58] Field of Search ................ 528/481, 373, 528/391, 396, 503, 377

[56] References Cited

U.S. PATENT DOCUMENTS

| | | | |
|---|---|---|---|
| 4,528,118 | 7/1985 | Murase et al. | 252/500 |
| 4,599,193 | 7/1986 | Murase et al. | 252/500 |
| 4,626,588 | 12/1986 | Murase et al. | 528/481 |

*Primary Examiner*—Shelley A. Dodson
*Attorney, Agent, or Firm*—Steven J. Church; Melvin J. Sliwka; John L. Forrest

[57] ABSTRACT

A process for synthesizing novel conjugated amino substituted phenylene polymers is disclosed. The process results in polymers having non-linear optical properties, and the polymers can be converted to electrically conductive polymers. The process involves reacting a novel bis-cycloalkylene sulfonium salt of 2,5,N,N-tetramethylaniline hydrochloride, such as 2,5-(N,N-dimethyl)aniline hydrochloride dimethylene bis-(tetramethylene sulfonium chloride) with alkali metal hydroxide to form a cycloalkylene sulfonium salt precursor polymer, and then heating the precursor polymer under conditions to produce the amino substituted phenylene vinylene polymer, such as poly(2-(N,N-dimethylamino) phenylene vinylene). Another process involves treatment of the bis chlormethyl dimethyl aniline hydrochloride derivative with alkali metal alkoxide.

12 Claims, No Drawings

PROCESS FOR MAKING AMINO FUNCTIONAL POLY(PARA-PHENYLENE VINYLENE)S

CROSS-REFERENCE TO RELATED APPLICATION

This application is a division of application Ser. No. 08/252,701 filed 31 May 1994.

BACKGROUND OF THE INVENTION

This invention relates to the production of polymers with electrical and/or third order non-linear optical (NLO) properties, and is particularly concerned with the process for preparation of novel conjugated amino substituted phenylene vinylene polymers having the above characteristics.

Polymers with electrical properties can be used for electromagnetic shielding, electronic counter measures, electrical device fabrication, and optical switching. Polymers with third order NLO properties can be used in smart skins, eye protection and optical switching.

The U.S. Pat. Nos. 4,599,193, 4,626,588 and 4,528,118 give some information on the synthesis of poly(para-phenylene vinylene), (PPV), and the synthesis of substituted PPV's. However, they do not teach the incorporation of amino substituents into the PPV backbone, nor do they claim amino substituted PPV's as part of their invention.

In the article "Synthesis and Electrical Conductivity of $AsF_5$– Doped Poly(Arylene Vinylenes)" by S. Antoun, et al., Polymer Bulletin, 15,181–184 (1986), a series of polymers containing 2,5-disubstituted phenylene vinylene units, and the polymer containing 1,4-naphthalene vinylene units, were prepared by polymerization of their bis(sulfonium salts) through a base elimination reaction in solution. Films of these polymers were cast from aqueous solution and chemically treated (doped) with $AsF_5$ vapor. The electrical conductivity of the doped films varied greatly with changes in polymer structure. The preparation of poly(1,4-naphthalenevinylene) is also disclosed in the article "Preparation and Electrical Conductivity of Poly(1,4 Naphthalene Vinylene)" by S. Antoun, et al., Journal of Polymer Science: Part C: Polymer Letters, Vol 24, 503–509, (1986). The preparation of dimethyl 2-(N,N-dimethylamino)terephthalate is described in H. Kauffmann, et al., Justus Liebig's Annalen der Chemie, 26, 393 (1912).

One object of the present invention is the provision of novel polymers having non-linear optical properties and/or electrical conductivity properties, and precursors of such polymers.

Another object is the provision of procedure for producing the above polymers and compounds.

SUMMARY OF THE INVENTION

The above objects are achieved according to the invention by the provision of a process producing a class of polymers based on amino substituted phenylene vinylene as the parent repeating unit and characterized by the following general formula:

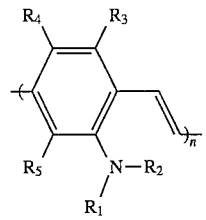

where the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl of from 1 to about 22 carbon atoms, such as methyl; alkoxy containing from 1 to about 22 carbon atoms, such as methoxy; nitro; halogen; amine (and quarternized amine) as described above; sulfonate groups; silyl; perfluoro alkyl, such as $(CF_3)$; and cyano esters and n is an integer from 2 to 20,000.

A preferred variety of this invention is the process for making poly(2-(N,N-dimethylamino) phenylene vinylene) (PDMAPV), the repeating unit characterizing the polymer having the structure shown below.

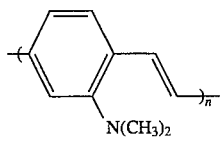

Another preferred variety of this invention is the process for making poly(2-(N,N-dimethylamino),5-nitro phenylene vinylene) (PANPPV) the repeating unit characterizing the polymer having the structure shown below.

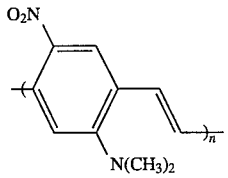

Yet another preferred variety of this invention is the process for making poly(2-(N,N-dimethylamino),3-nitro phenylene vinylene) (PANPPV) the repeating unit characterizing the polymer having the structure shown below.

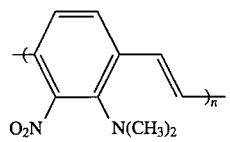

Films of the above class of polymers can be formed by casting from a solvent solution, with the resulting films exhibiting strong, stable nonlinear optical properties. Such films become highly electrically conductive after a suitable doping treatment. Powders of the above polymers can be pressed into pellets.

DETAILED DESCRIPTION OF THE INVENTION AND PREFERRED EMBODIMENTS

The conjugated amino substituted phenylene vinylene polymers of the invention are prepared by polymerizing a bis-cycloalkylene sulfonium salt of amino substituted phenyl dimethylene having the following formula:

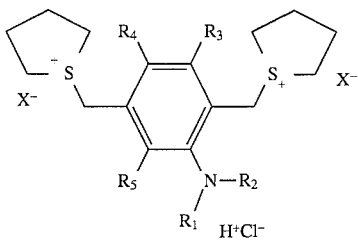

where: X is halogen; the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl of from 1 to about 22 carbon atoms, such as methyl; alkoxy containing from 1 to about 22 carbon atoms, such as methoxy; nitro; halogen; amine (and quarternized amine) as described above; sulphonate groups; silyl; perfluoro alkyl, such as ($CF_3$); and cyano esters, in the presence of alkali metal hydroxide at reduced temperature to form a cycloalkylene sulfonium salt precursor polymer. This is followed by evaporation of solvent and then heating of such precursor polymer under conditions to form the amino substituted phenylene vinylene polymer I above. Thus, poly(2-(N,N-dimethylamino) phenylene vinylene) can be prepared by the polymerization of the bis-sulfonium salt, 2,5-(N,N-dimethyl)aniline hydrochloride dimethylene bis-(tetramethylene sulfonium chloride) in solution in water, or other suitable solvent, in the presence of sodium hydroxide, at low temperature, such as 0° C., to form a cycloalkylene sulfonium salt precursor polymer, followed by heating of the precursor polymer at a temperature between about 150° C. and about 300° C., in vacuo, according to the following reaction scheme:

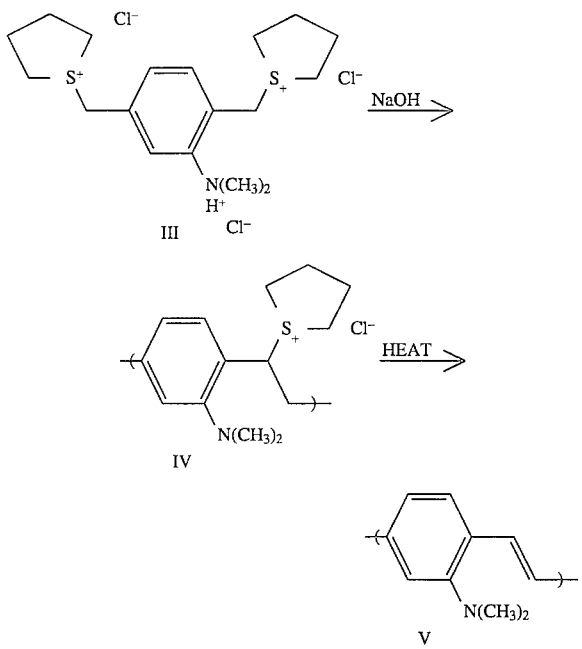

Poly(2-(N,N-dimethylamino) phenylene vinylene), can also be prepared by treating the aniline hydrochloride with strong base such as potassium tert-butoxide (KO-t-Bu) in solvents such as dry tetrahydrofuran under nitrogen. In this case the polymer V is formed immediately.

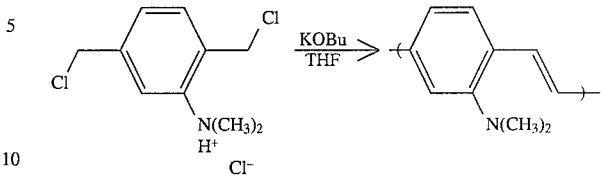

The bis-cycloalkylene sulfonium monomer salts (III) and the bis chloromethyl amines (IX) noted above are novel compounds which, such as in the case of the dimethylamino derivative compound III noted above, can be prepared by the following reaction scheme:

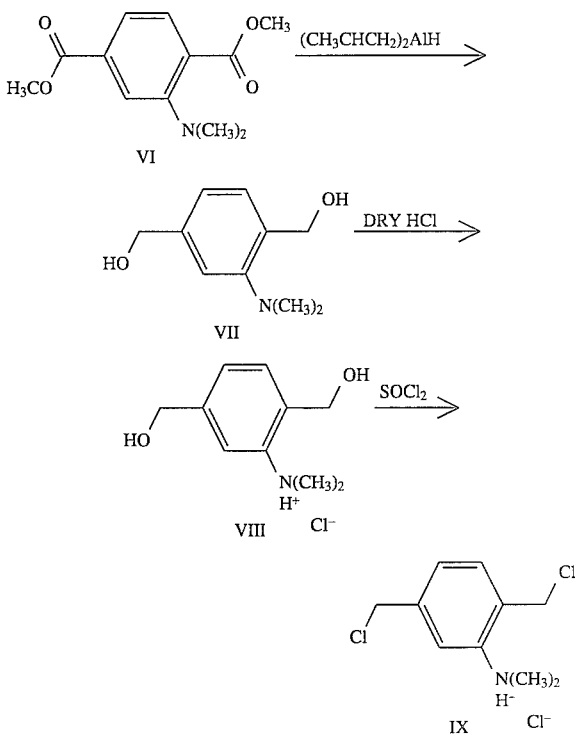

and then reacting the resulting chlorinated compound IX with a solution of tetrahydrothiophene in methyl alcohol, or other polar solvent, to form the bis-cycloalkylene sulfonium monomer salt III above. The corresponding bromide derivative of monomer salt III above can be prepared in the same manner as described above, substituting thionyl bromide for the thionyl chloride.

The number of repeating units in the conjugated amino substituted phenylene vinylene polymers of the invention, particularly PDMAPV, is such that the molecular weight of such polymers can range from about 500 to about 2,000,000. (As measured by current techniques such as Gel permeation chromatography or Laser light scattering). The number of repeating units accordingly can range from about 2 to about 20,000.

In its neutral state the conjugation of the PDMAPV polymer gives rise to third order NLO properties. Upon electrochemical and chemical "doping", the polymer is transformed to an electrically conducting state. The electrical conductivity of the class of amino substituted phenylene vinylene polymers hereof can range from about $10^{-4}$ to about $10^3$ siemens/cm.

It is noted that one or more of various substituents R1 and R2 can be various types of hydrocarbons. Specific examples of such substituents include: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. It is further noted that one or more of the other substituents R3, R4 and R5 can be: alkyl of from 1 to about 22 carbon atoms, such as methyl; alkoxy containing from 1 to about 22 carbon atoms, such as methoxy; nitro; halogen; amino as described above; sulfonates; silyl; perfluoro alkyl, such as ($CF_3$); and cyano esters. Thus, examples of specific polymers of the invention in addition to PDMAPV include poly(2,5-bis-(N,N-dimethylamino) phenylene vinylene), poly(2,3,5-tris-(N,N-dimethylamino) phenylene vinylene), poly(2,3,5,6-tetrakis-(N,N-dimethylamino) phenylene vinylene), phenylene vinylene), poly (2-(N-methylamino)-5(N-propyl-N-butylamino, phenylene vinylene), poly(2-(N,N-dimethylamino)-5-nitro phenylene vinylene), poly(2-(N,N-dimethylamino)5-cyano-6-methoxy phenylene vinylene) and; poly(2-(N-hydroxymethyl,N-methylamino)-3-hexyl-5-octadecyl-6-perfluoropentyl phenylene vinylene).

Doping of the polymers of the invention for transformation thereof to a conducting state can be carried out in various ways. According to one mode of procedure this can be done electrochemically by cyclic voltammetry. This method is used to measure the oxidation or reduction potential (versus a reference electrode) of the polymer or compound involved during electrochemical oxidation. Films of the precursor polymer such as polymer IV are cast upon the positive working electrode using, for example, about 0.01 ml of precursor polymer solution in water, and heating the film under vacuum at the appropriate temperature to convert the precursor polymer to the final polymer, such as polymer V. Conductivity can also be conferred by chemical treatment of the polymers such as polymer V with oxidant dopants such as $AsF_5$, iodine, $H_2SO_4$, $SO_3$, $HClO_4$, $CF_3COOH$, etc.

The following are examples of practice of the invention.

EXAMPLE 1

Preparation of precursor polymer IV

Both solutions used in the following polymerization step were deoxygenated with $N_2$ at room temperature for two (2) hours. To 8 ml of a 0.87M (approximately) aqueous solution of the sulfonium salt monomer (III), (0.007 mol approximately) was added all at once under nitrogen 10 ml of 1.44M aqueous solution of NaOH (0.014 mol) (the extra base is added to convert the amine hydrochloride groups of the monomer to amine groups). The contents of the flask turned orange-yellow and slightly cloudy after about 5 minutes. After 35 minutes the pH of the water in the flask was about 12, indicating that the amine hydrochloride groups were converted. The water was neutralized to pH 5 with about 8 ml of dilute acid, and the mixture turned pale yellow and became less cloudy. This mixture was dialysed for about 4 days against slightly basic water. The resulting solution (with a small amount of precipitate) was filtered, giving a clear solution of IV that fluoresced green upon excitation with UV light.

EXAMPLE 2

Film Casting

Five (5) ml of the precursor polymer (IV) solution of Example 1 were placed on a treated glass substrate (the glass was treated with dichlorodimethyl silane to facilitate removal of the polymer film) and allowed to evaporate. The resulting film could be easily removed from the substrate and an Infrared Spectrum of the fresh film was taken. The fresh film was then heated in vacuo at 250° C. for twelve (12) hours for conversion of the precursor polymer (IV) to product polymer (V). The heat treatment procedure was repeated for several different temperatures (such as 170°, 260° and 300° C.).

EXAMPLE 3

A free standing film made from the undiluted of IV solution was converted to the final polymer (V) by the methods described above (such as Example 2) and then treated with fuming sulfuric acid in a vacuum atmosphere. A color change from greenish yellow to black was observed, indicating protonic doping of the polymer to its conductive form.

EXAMPLE 4

0.25 grams of compound IX was added to a solution of 0.66 g of potassium tert-butoxide in 35 ml tetrahydrofuran cooled with a dry ice/isopropanol bath. A yellow-green solution formed. After two hours the dry ice bath was removed and the solution stirred for an additional 2.5 hours at around 25° C. A bright orange powder (Polymer V) precipitated. Elemental Analysis: Calculated for $C_{10}H_{11}N$: C, 82.72; H, 7.64; N, 9.65; Found: C, 80.84; H, 7.66; N, 9.84. A suspension of the orange powder in meta cresol changed to a pale yellow emulsion upon addition of strong acids such as hydrochloric, camphor sulfonic, and trifluoro acetic acid, indicative of the formation of the quarternized ammonium salt of the polymer.

EXAMPLE 5

0.07 g of polymer V was added to a mixture of 2 ml nitric acid and 4 ml sulfuric acid. After about 4 hours the polymer powder dissolved, indicating nitration of the aromatic ring. The solution was filtered through a glass frit, after which 150 ml of methanol and 30 ml of water were added to precipitate out the polymer. The nitrated aminophenylene vinylene polymer residue was filtered off and dried.

EXAMPLE 6

0.2 g of polymer V was added to 3 ml of 18% fuming sulfuric acid. The polymer almost immediately turned black. After several weeks 150 ml of methanol was added to the suspension, the polymer was filtered off and dried. A black rubbery solid was obtained. The conductivity of this sulfonated aminophenylene vinylene was $10^{-2}$ Siemens/cm.

EXAMPLE 8

0.149 of polymer V and 0.265 g of camphor sulfonic acid were added to 10 ml of cresol in a 25 ml flask. The flask and contents were placed in an ultrasonic bath for 24 hours. After 24 hours a pale green solution was obtained and was filtered. This soluble polymer is the camphor sulfonate of polymer V according to IR analysis of a film cast from the solution.

From the foregoing, it is seen that the invention provides for the preparation of a novel class of amino substituted phenylene vinylene polymers, including certain amino substituted phenylene monomers employed in preparing such polymers, such polymers having non-linear optical properties and also exhibiting electrical conductivity upon electrochemical or chemical oxidation doping. Various uses of such polymers are noted above.

Since various changes and modifications can be made in the invention without departing from the spirit of the invention, the invention is not to be taken as limited except by the scope of the appended claims.

What is now claimed:

1. A process for producing amino substituted phenylene vinylene polymers by reacting a bis-cycloalkylene sulfonium salt of an amino substituted bishalomethyl benzene compound with alkali metal hydroxide at reduced temperature to form a cycloalkylene sulfonium salt precursor polymer and heating said precursor polymer at a temperature of about 150° C. to about 300° C., said polymers having a singular independent repeating unit of the general formula (I):

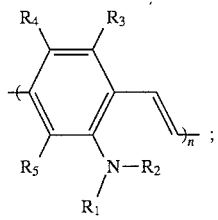

wherein $R_1$ and $R_2$ are each independently hydrogen; alkyl having 1 to 22 carbon atoms; alkyl sulfonate having 1 to 22 carbon atoms; alcohol having 1 to 22 carbon atoms;

$R_3$, $R_4$, $R_5$ are each independently hydrogen; alkyl having 1 to 22 carbon atoms; alkoxy having 1 to 22 carbon atoms; nitro; halogen; amine; sulfonates; silyl; perfluoro alkyl; and cyano esters; and n is an integer from 2 to 20,000.

2. A process as defined in claim 1 wherein the amine group is quaternized by: hydrogen halides; alkyl and aryl halide having 1 to 22 carbon atoms; alkyl sulfonate having 1 to 22 carbon atoms; alcohol having 1 to 22 carbon atoms; acetic acids; carboxylic acids; or sulfonic acids.

3. A process as defined in claim 1, for producing poly(2-(N,N-dimethylamino) phenylene vinylene) which comprises reacting a bis-cycloalkylene sulfonium salt having the formula:

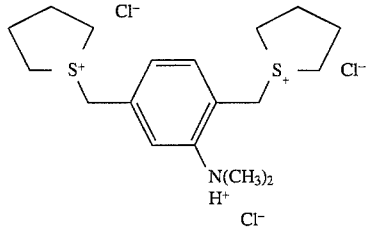

with sodium hydroxide at a temperature of about 0° C. to form a cycloalkylene sulfonium salt precursor polymer, and heating said precursor polymer at between 150° C. and about 300° C. and in vacuo.

4. A process as defined in claim 1, wherein the heating of said precursor polymer is at about 260° C.

5. A process for producing amino substituted phenylene vinylene polymers which comprises reacting bis chloromethyl amino phenylene compound with alkali metal alkoxide to produce a polymer having the repeating unit of the formula:

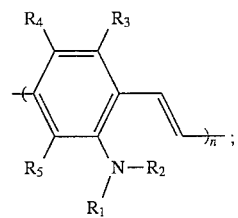

wherein $R_1$ and $R_2$ are each independently hydrogen; alkyl having 1 to 22 carbon atoms; alkyl sulfonate having 1 to 22 carbon atoms; alcohol having 1 to 22 carbon atoms;

$R_3$, $R_4$, $R_5$ are each independently hydrogen; alkyl having 1 to 22 carbon atoms; alkoxy having 1 to 22 carbon atoms; nitro; halogen; amine; sulfonates; silyl; perfluoro alkyl; and cyano esters; and n is an integer from 2 to 20,000.

6. A process as defined in claim 5 wherein the amine group is quaternized by: hydrogen halides; alkyl and aryl halide having 1 to 22 carbon atoms; alkyl sulfonate having 1 to 22 carbon atoms; alcohol having 1 to 22 carbon atoms; acetic acids; carboxylic acids; or sulfonic acids.

7. A process as defined in claim 5, for producing poly(2-(N,N-dimethylamino phenylene vinylene) which comprises reacting bis-chloromethyl N,N dimethyl aniline hydrochloride having the formula:

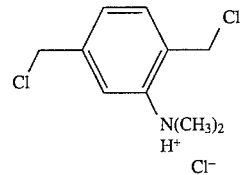

with potassium t-butoxide at temperatures of about −20° C.

8. Polymers as defined in claim 1, having the formula:

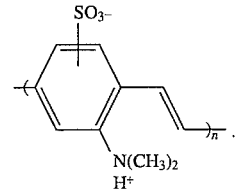

9. A process as defined in claim 1, wherein said amino substituted phenylene vinylene polymers have a number average molecular weight ranging from about 500 to about 2,000,000.

10. A process as defined in claim 1, wherein $R_1$ and $R_2$ are each independently hydrogen; methyl; decyl sulfonate; or propanol;

$R_3$, $R_4$, $R_5$ are each independently hydrogen; methyl; methoxy; nitro; halogen; amine; sulfonates; silyl; perfluoro alkyl; or cyano esters.

11. A process as defined in claim 2, wherein the amine group is quaternized by: hydrochloric acid; methylbromides; bromomethylbenzene; sodium camphor sulfonate; chloropropanol; trifluoroacetic acid, camphor sulfonic acid; or toluene sulfonic acid.

12. A process as defined in claim 3, wherein the heating of said precursor polymer is at about 260° C.

* * * * *